United States Patent [19]

Amick et al.

[11] Patent Number: 5,555,799

[45] Date of Patent: Sep. 17, 1996

[54] NON-STICK LAMINATING ENDLESS BELT PRESS

[75] Inventors: Darryl Amick; Gary McDowell; Hershel R. Henson, all of Albany; Jerald Wille, Corvalis, all of Oreg.

[73] Assignee: Teledyne Industries, Inc., Albany, Oreg.

[21] Appl. No.: 463,690

[22] Filed: Jun. 5, 1995

Related U.S. Application Data

[62] Division of Ser. No. 295,013, Aug. 24, 1994.

[51] Int. Cl.⁶ ............................. B30B 5/04; B30B 15/34
[52] U.S. Cl. ........................... 100/930 RP; 100/151; 156/583.5; 474/272
[58] Field of Search ..................... 100/93 RP, 151; 474/237, 270, 272; 156/583.5

[56] References Cited

U.S. PATENT DOCUMENTS

| | | | |
|---|---|---|---|
| 2,083,527 | 6/1937 | Bierer | 474/272 |
| 4,467,718 | 8/1984 | Held | 100/151 |
| 4,533,590 | 8/1985 | Dörries et al. | 428/211 |
| 4,921,037 | 5/1990 | Bergeron et al. | 100/151 |
| 5,169,460 | 12/1992 | Mae | 148/421 |
| 5,332,545 | 7/1994 | Love | 420/420 |

FOREIGN PATENT DOCUMENTS 62-155350  7/1987  Japan ........................... 474/272

OTHER PUBLICATIONS

*Metals Handbook*, Ninth Edition, vol. 3, 1980, pp. 399–400.

Primary Examiner—Stephen F. Gerrity
Attorney, Agent, or Firm—Shoemaker and Mattare, Ltd.

[57] ABSTRACT

A laminating press for wood products includes at least one pair of heated drums rotating on parallel axes and an endless belt running around the drums, and a device for pressing a stack of materials to be laminated against the belt between the drums, wherein the belt consists essentially of a zirconium or titanium alloy having a thermal diffusivity of at least 0.08 cm²/sec and Young's modulus below 20 million psi. Unplated, the belt material provides a non-stick surface with respect to melamine, and because it is unplated, the belt can be resurfaced when worn. Alternatively, the above materials are used in constructing plates for a platen-type laminating press.

1 Claim, 2 Drawing Sheets

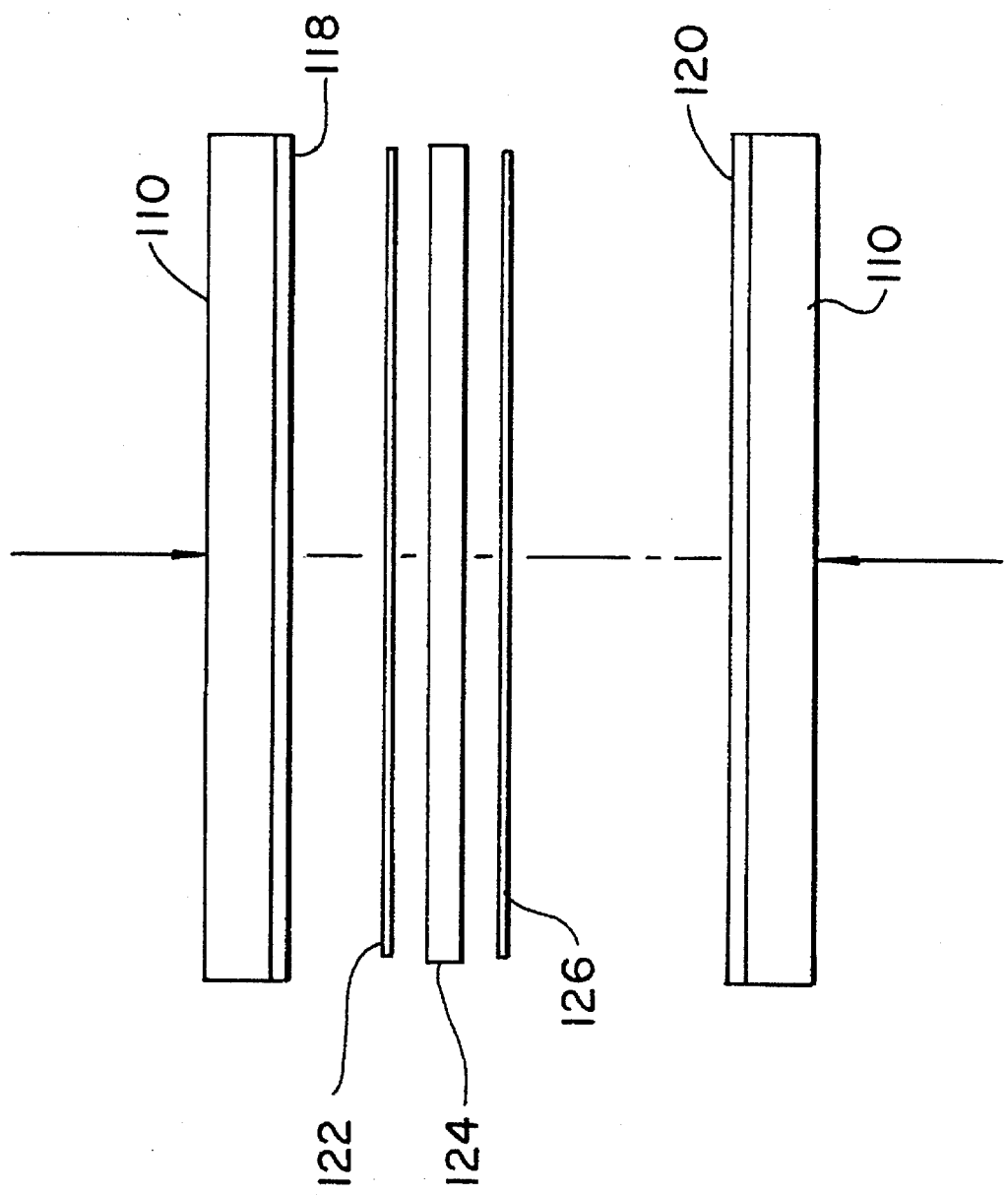

NON-STICK LAMINATING ENDLESS BELT PRESS

This is a division of application Ser. No. 08/295,013, filed Aug. 24, 1994.

BACKGROUND OF THE INVENTION

This invention relates generally to wood product manufacture, and more particularly to a non-stick belt or platen for a laminating press.

There are a wide variety of products in which a thermosetting polymer, for example, melamine, is laminated to a wood product substrate such as particle board, under controlled conditions of pressure and temperature. The heat necessary for polymeric curing and producing a desired surface texture (glossy, stippled, wood grain, herringbone, etc.) are imparted by metal plates or belts.

Plate presses are much more common than belt-type machines. They typically are single-acting presses in which the laminate is squeezed between textured, heated top and bottom plates backed by heat-conducting pads. The platens may be made of chromium-plated stainless steel, or plated brass. Brass has the advantage of high thermal conductivity, resulting in shorter cycle times, but stainless steel is harder and lasts longer. For wood product panel pressing, such platens are chrome plated, because melamine will stick to either stainless steel or brass.

In a belt-type machine, the laminate is passed between upper and lower stainless steel belts, each of which travel around a pair of heated drums maintained at about 200°–210° C. The heat transferred to melamine-soaked paper by the belt produces cross-linking ("curing") of the polymer at about 160° C. The stainless belts normally used are plated with chromium, or chromium on copper, possibly in varying thickness if a surface texture is desired.

Both belt and plate laminating presses have some problems. Because they are surface plated, present plates or belts cannot be repaired or reworked. Additionally, their surfaces are subject to damage from foreign objects such as nuts, bolts and rocks. In belt applications, which are subject to flexure as the belt passes around its non-circular path, the brittle chromium plating is subject to cracking and spalling after a few hundred thousand flexural cycles, particularly in welded regions of the belt. Also, non-uniform heating and mechanical forces may warp the belt, making it difficult to steer the belt properly around the drums. Attempting to correct this condition by increasing belt tension sometimes results in permanently stretching the belt.

SUMMARY OF THE INVENTION

An object of the invention is to provide a platen, or a continuous metal belt or band, which can be used in a laminating press, and does not require plating to achieve a non-stick surface with respect to polymeric adhesives.

Another object of the invention is to provide a metal laminating press belt or platen which can be resurfaced or reworked when it is worn.

A further object of the invention is to provide a metal belt or platen which is tolerant of foreign objects, that is, can better survive accidental contact with nuts, bolts, rocks, abrasive particles and the like.

According to one aspect of this invention, a laminating press for wood products includes at least one pair of heated drums rotating on parallel axes and an endless belt running around the drums, and means for pressing a stack of materials to be laminated against a portion of the belt running between the drums. The belt consists essentially of a zirconium or titanium alloy having a thermal diffusivity of at least 0.08 $cm^2$/sec and Young's modulus below 20 million psi. Unplated, the belt material provides a non-stick surface with respect to melamine, and because it is unplated, the belt can be resurfaced when worn. The principles of the invention apply to platen-type presses as well.

BRIEF DESCRIPTION OF THE DRAWINGS

In the accompanying drawings, FIG. 2 is a simplified side elevation of a platen-type press embodying the invention.

DESCRIPTION OF THE PREFERRED EMBODIMENT

Figure 1:
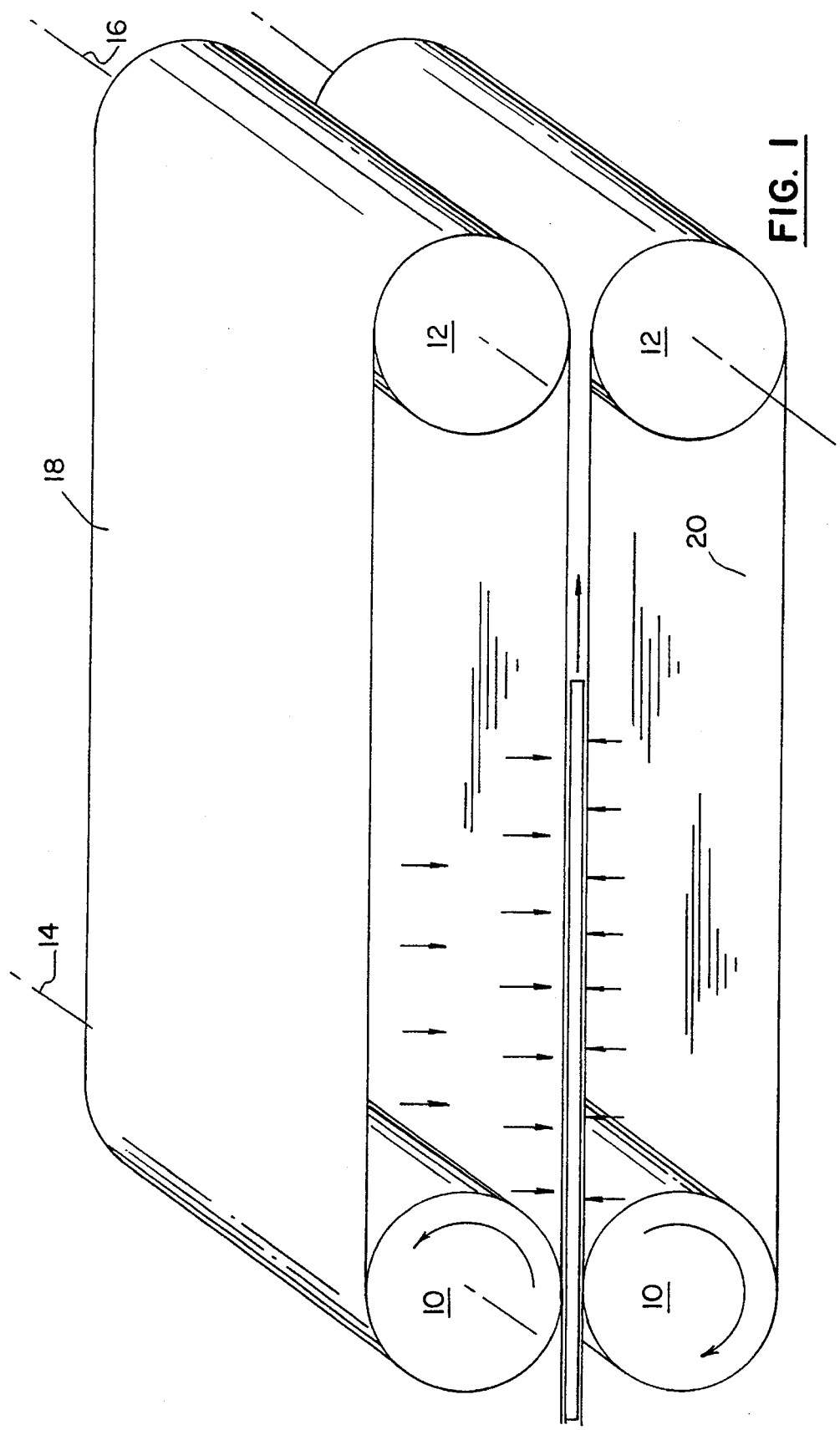
FIG. 1 is a simplified cabinet drawing of a belt-type laminating press embodying the invention.

A belt-type laminating press (FIG. 1) embodying the invention includes two pairs of drums 10,12 rotating on spaced, parallel, horizontal axes 14,16. One pair of drums lies above a horizontal center plane of the apparatus (the product moves along this plane), and the other pair of drums lies below it. Endless metal belts 18 and 20 run around the respective drum pairs. Their presently preferred dimensions are 0.090 inch thick, 64 inches wide, and 37.3 feet long (perimeter). The surface of the belt may be textured to produce embossed surfaces on the produce. Each belt is maintained under substantial tension by conventional means (not shown) so that it makes intimate thermal contact with the drums.

At least one, and preferably both, of the drums in each pair is heated, and maintained at a temperature of about 190° C. heat is transferred to each belt as it passes over the drums, and from the belt to the laminate materials 22 where they contact it.

Uniform pressure is applied to the laminate by one or more air chambers inside each loop. Such chambers are conventional; the selection of an appropriate chamber is a routine matter. The chambers are pressurized with air from a pump (not shown), and maintained at a desired pressure while tile press is running.

A press of this general type is shown in U.S. Pat. No. 4,533,590 whose belts are described generally as made of steel The present invention differs from the prior art primarily in that the belts are made from a low-modulus metal which does not stick to melamine. The presently preferred metal for this use is a commercially pure 702 grade Zirconium alloy having a Young's modulus of 14,000,000 psi. A second preferred material is a titanium alloy comprising 3 % aluminum and 2½% vanadium, having a Young's modulus of 18,000,000 psi. Other mechanical properties of the alloys, and 304 grade stainless, are as below:

| Alloy | Yield strength (kpsi) | Ultimate strength (kpsi) | Maximum elongation (%) | Strain at yield |
|---|---|---|---|---|
| 304 SS | 40 | 90 | 60 | .00133 |
| Zr 702 | 45 | 65 | 40 | .0032 |
| Ti-3-2½ | 60 | 100 | 40 | .0033 |

The strength of either the titanium or zirconium alloy, in combination with its relative low modulus of elasticity, enables each material to undergo substantial strain without failure in contrast to the brittle chrome plating layer required on prior belts. Additionally, the problem of a mismatch between the thermal coefficients of expansion of diverse materials is avoided. The ability to withstand high strains results in good dent resistance, when foreign objects such as stones or bolts are embedded in the work product. Using a low modulus (highly elastic) metal also increases the stretchability of the belt. A belt which can be stretched more tends to stay on the drums better and not walk off sideways during operation.

Of particular importance to the contemplated use of the belts on machines for pressing melamine-soaked laminates, is that each of the materials described in the preceding paragraph also is relatively non-stick, compared to unplated stainless steel, when used on melamine products. We cannot presently quantify non-stickiness, but ordinary people can readily detect the relative non-stickiness of various combinations of materials.

One might think that belts as described above might have a cost disadvantage, since they are substantially more costly to manufacture than belts of stainless steel, even plated stainless. The titanium alloy mentioned does cost about twice as much as stainless, and the zirconium alloy three to four times as much. We calculate, however, that the initial cost differential will be more than offset by the increased life obtainable from the zirconium or titanium belts. The longevity of the inventive belts results both from the physical properties described above, and from the fact that unplated belts can be resurfaced. The number of lives one can obtain from a belt depends, of course, on the amount of wear that occurs between resurfacings, and the original thickness of the belt. We anticipate that 0.090 inch thick belts constructed and used as described herein may be capable of six to ten resurfacings. This, compared to the single life of a plated belt, accounts for the expected cost economies. Additionally, unplated belts can be welded, if damaged, while chrome-plated belts cannot be practically rewelded.

In some cases, belts with textured surfaces are used to produce attractive surface finishes on the wood panel product. Plated stainless steel belts, particularly when textured, tend to load up with melamine in the recesses. We expect that belts constructed according to this invention will show improved performance in this regard.

A final advantage is that both titanium and zirconium alloys conduct heat better than stainless steel. High conductivity is the reason why brass is often preferred for platen-type presses. Actually, a better criterion of the thermal performance of a belt is thermal diffusivity, which measures the speed with which a transient thermal gradient in a material is dissipated. Thermal diffusivity is defined as $k/\rho C_p$, where k is thermal conductivity, $\rho$ is density, and $C_p$ is specific heat. The values of thermal diffusivity for stainless steel, zirconium and titanium, respectively, are 0.0406, 0.0934, and 0.0850 $cm^2/sec$. Because the preferred materials have thermal diffusivities above 0.08 $cm^2/sec$, they dissipate heat more than twice as fast as does stainless steel, and will transfer heat from the drums to the laminate more evenly and quickly than steel belts, making higher production speeds possible.

To this point, the invention has been described as practiced oil belt-type presses. We plan, however, to use the invention on simpler platen presses as well, since they are currently much more prevalent. One such device is depicted in FIG. 2.

The invention has been practiced on plate presses, as described in the following examples.

EXAMPLE I

A pair of unplated press plates were produced from conventional rolled plate titanium alloy containing 3% aluminum and 2.5% vanadium. The surfaces were ground to 63 RMS, and then subjected to peening with 540-size cast steel blasting shot propelled at various velocities (ASTM/Allman intensities 12–23). The plates were then installed in a 20-T Wabash laboratory press by affixing them to the press heated platens operating at 374° C. Actual press plate temperature during operation was estimated to be 160° C. to 180° C. A laminate containing melamine was cured to normal temperature within 35 seconds pressing time, and released from the plates without sticking.

EXAMPLE II

Unplated press plates were produced from zirconium alloy plate, finished and peened as in the previous example, and installed in a similar press operating in the same temperature range. After pressing with the zirconium plates, melamine laminate panels released without sticking.

It is expected that belt-type presses having belts made of zirconium or titanium alloy will exhibit properties similar to the plate presses described above, but will have higher production capacities because of their continuous operating mode.

Since the invention is subject to modifications and variations, it is intended that the foregoing description and the accompanying drawings shall be interpreted as illustrative of only one form of the invention, whose scope is to be measured by the following claims.

We claim:

1. A laminating press for wood products, comprising at least one pair of heated drums rotating on parallel axes and an endless unplated belt running around said drums, and means for pressing a stack of materials to be laminated against said belt between said drums, wherein the belt consists essentially of an alloy of a metal selected from the group consisting of zirconium and titanium, and having a thermal diffusivity of at least 0.06 $cm^2/sec$ and a Young's modulus of below 20 million psi.

* * * * *